United States Patent [19]

Anderson

[11] Patent Number: 5,075,879
[45] Date of Patent: Dec. 24, 1991

[54] ABSOLUTE VALUE DECODER

[75] Inventor: Donald C. Anderson, Austin, Tex.

[73] Assignee: Motorola, Inc., Schaumburg, Ill.

[21] Appl. No.: 420,977

[22] Filed: Oct. 13, 1989

[51] Int. Cl.$^5$ .............................................. G06F 7/00
[52] U.S. Cl. ........................... 364/715.01; 364/715.08;
364/748
[58] Field of Search ............... 364/715.01, 748, 715.08

[56] References Cited

U.S. PATENT DOCUMENTS

| | | | |
|---|---|---|---|
| 3,814,925 | 6/1974 | Spannagel | 364/748 X |
| 4,807,172 | 2/1989 | Nukiyama | 364/715.08 |
| 4,811,272 | 3/1989 | Wolrich et al. | 364/748 X |
| 4,849,921 | 7/1989 | Yasumoto et al. | 364/715.01 |
| 4,890,251 | 12/1989 | Nitta et al. | 364/715.08 |
| 4,908,788 | 3/1990 | Fujiyama | 364/715.08 X |

Primary Examiner—Tan V. Mai
Attorney, Agent, or Firm—Paul J. Polansky

[57] ABSTRACT

An absolute value decoder for decoding an absolute value of an input number in two's complement format. The absolute value decoder receives the input number and inverts each bit. Each bit and each inverted bit are provided to a plurality of columns, and each of the plurality of columns predecodes a unique value of the input number. A precoded signal is precharged during a precharge period and subsequently discharged in response to corresponding bits in the input number not matching the unique number corresponding to the predecoded signal. A grouping portion combines sets of two signals corresponding to a negative number and a positive number of a given absolute value, and provides output signals in response. In another embodiment, columns of transistors provide the predecoded signals for ranges of numbers which can be grouped further so that the absolute value decoder functions as a range detector.

11 Claims, 3 Drawing Sheets

ABSOLUTE VALUE DECODER

FIELD OF THE INVENTION

This invention relates generally to arithmetic circuits, and more particularly, to an absolute value decoder for detecting an absolute value of a number.

BACKGROUND OF THE INVENTION

In a data processor that performs arithmetic operations, typically a single chip floating point coprocessor or a floating point processor integrated on-chip, numbers are expressed in a floating-point format as a mantissa and an exponent. When two numbers expressed in the floating point format are to be added or subtracted, the exponents of the two numbers must first be made equal. The exponents of the two numbers are made equal by shifting one of the numbers by an amount equal to a difference between the two exponents, a process called denormalization shift. When the exponents of the numbers are made equal by the denormalization shift, the numbers can then be added or substracted by hardware circuitry.

To accomplish the denormalization shift, the exponents are first subtracted. The difference in the exponents may be negative or positive, however, since it is not known before the subtraction which of the two numbers is larger. To calculate the denormalization shift amount from the exponents of the two numbers, it is necessary to determine an absolute value of a difference of the two exponents. The absolute value operation can be performed as follows. If the difference in the exponents is a positive number, then the absolute value of the difference is simply equal to the difference. If the difference is a negative number, however, the difference must be converted to a positive number. Converting a negative number to a positive number is more complicated if the difference is in two's complement format than in another format like one's complement. The absolute value of a negative number in two's complement format can be determined by complementing the negative number, and then adding one to the result. Converting a negative number to a positive number in this manner is time consuming because a complemented negative number must be moved into an adder, and added to one. A resulting carry operation can consume several clock cycles in a worst case scenario. Subsequently, the absolute value thus obtained must be decoded to provide a unique signal for each absolute value. Since performing such a function is frequently necessary in an arithmetic data processor, overall performance is greatly limited by the speed of performing this function.

BRIEF DESCRIPTION OF THE INVENTION

Accordingly, it is an object of the present invention to provide an improved absolute value decoder for determining an absolute value of an input number.

It is another object of the present invention to provide a circuit which determines an absolute value of an input number with improved speed.

It is yet another object of the present invention to provide an improved circuit and method for detecting a range of values of a two's complement number.

In carrying out these and other objects of the invention, there is provided, in one form, a circuit for providing an output signal in response to an input number, the output signal corresponding to an absolute value for the input number. The circuit comprises a bit inversion portion, a precharged portion, a predecoding portion, and a grouping portion. The bit inversion portion receives the input number and provides a logical complement of each bit in the input number. The precharge portion precharges each of a plurality of predecoded signals to a first logic state during a precharge period. The predecoding portion is coupled to the bit inversion portion, and provides the plurality of predecoded signals, each predecoded signal provided in response to one or more numerical values of the input number. The grouping portion is coupled to the predecoding portion and provides the absolute value bit in response to either a predecoded signal representing a positive number having the predetermined absolute value or a predecoded signal representing a negative number having the predetermined absolute value.

These and other objects, features and advantages will be more clearly understood from the following detailed description taken in conjuction with the accompanying drawings.

DETAILED DESCRIPTION OF THE INVENTION

Figure 1:
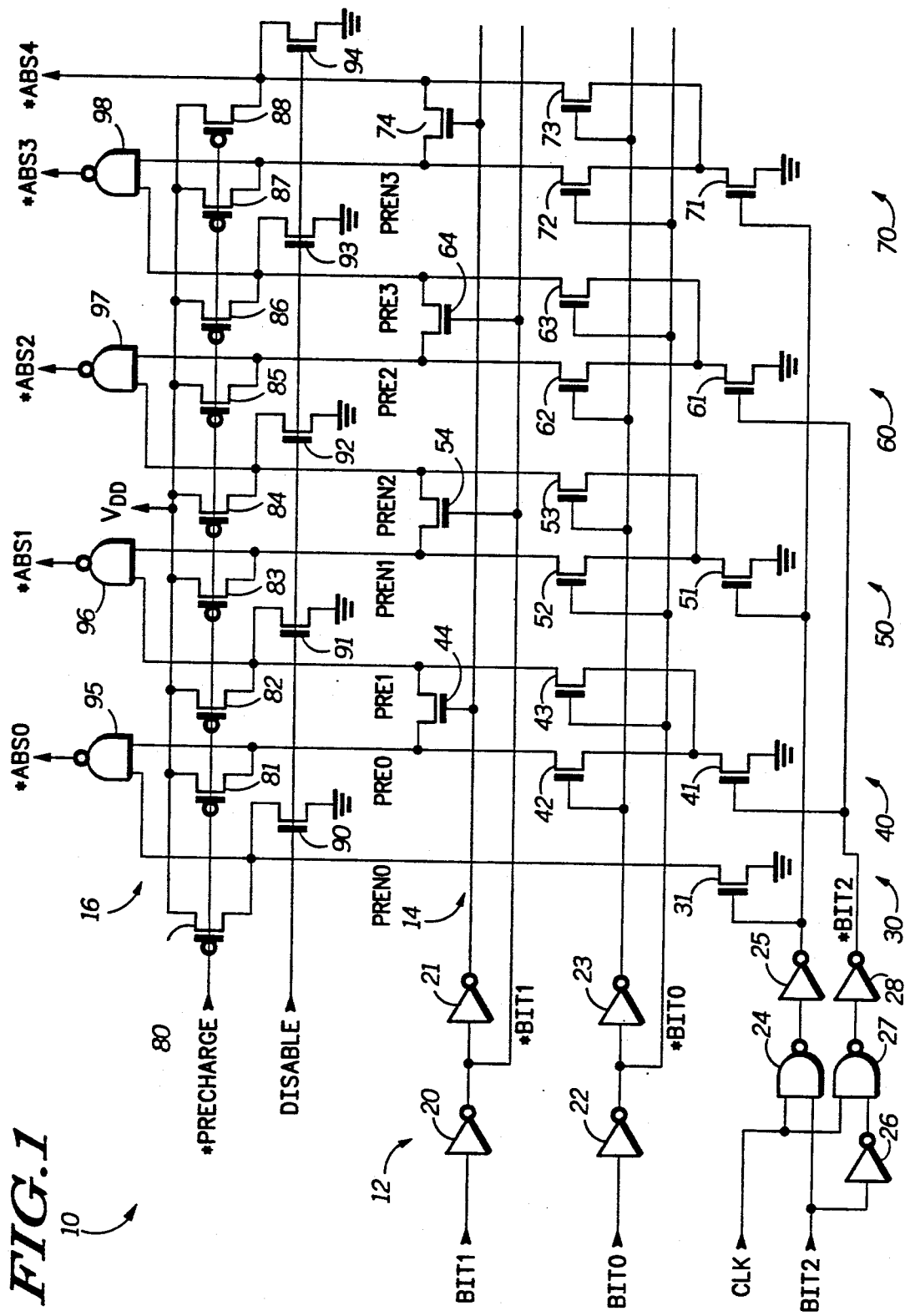
FIG. 1 illustrates in partial schematic form an absolute value decoder in accordance with the present invention.

FIG. 1 illustrates a first embodiment of an absolute value decoder 10 in accordance with the present invention. Absolute value decoder 10 determines an absolute value of a three-digit input number in two's complement format. While determining the absolute value of a three digit input number is a straightforward example, absolute value decoder 10 is consistent with the present invention and is useful in understanding a preferred embodiment presented below.

Absolute value decoder 10 generally comprises a bit inversion portion 12, a predecoding portion 14, and a grouping portion 16. Bit inversion portion 12 comprises an inverter 20, an inverter 21, an inverter 22, an inverter 23, a NAND gate 24, an inverter 25, an inverter 26, a NAND gate 27, and an inverter 28. Predecoding portion 14 comprises columns of transistors such as a column 30, a column 40, a column 50, a column 60, and a column 70. Column 30 comprises an N-channel transistor 31. Column 40 comprises an N-channel transistor 41, an N-channel transistor 42, an N-channel transistor 43, and an N-channel transistor 44. Column 50 comprises an N-channel transistor 51, an N-channel transistor 52, an N-channel transistor 53, and an N-channel transistor 54. Column 60 comprises an N-channel transistor 61, an N-channel transistor 62, an N-channel transistor 63, and an N-channel transistor 64. Column 70 comprises an N-channel transistor 71, an N-channel transistor 72, an N-channel transistor 73, and an N-channel transistor 74. Grouping portion 16 comprises a P-channel transistor 80, a P-channel transistor 81, a P-channel transistor 82, a P-channel transistor 83, a P-channel transistor 84, a P-channel transistor 85, a P-channel transistor 86, a P-channel transistor 87, a P-channel transistor 88, an N-channel transistor 90, an N-channel transistor 91, an N-channel transistor 92, an N-channel transistor 93, an N-channel transistor 94, a NAND gate 95, a NAND gate 96, a NAND gate 97, and a NAND gate 98.

A three-digit input number in two's complement format has a most significant bit, or sign bit, denoted BIT2, a middle bit denoted BIT1, and a least significant bit denoted BIT0. Inverter 20 has an input terminal for receiving BIT1, and an output terminal for supplying *BIT1. An asterisk (*) before a signal indicates that the signal is active at a logic low. Inverter 21 has an input terminal connected to the output terminal of inverter 20, and an output terminal for providing BIT1. For ease of discussion, it is assumed that a signal twice inverted is equal to the signal itself; in reality it is a buffered version of the signal. Inverter 22 has an input terminal for receiving BIT0, and an output terminal for supplying *BIT0. Inverter 23 has an input terminal connected to the output terminal of inverter 22, and an output terminal for supplying BIT0. NAND gate 24 has a first input terminal for receiving a clock signal CLK, a second input terminal for receiving BIT2, and an output terminal. Inverter 25 has an input terminal connected to the output terminal of NAND gate 24, and an output terminal. Inverter 26 has an input terminal for receiving BIT2, and an output terminal. NAND gate 27 has a first input terminal for receiving CLK, a second input terminal connected to the output terminal of inverter 26, and an output terminal. Inverter 28 has an input terminal connected to the output terminal of inverter 27, and an output terminal. The output terminals of inverters 25 and 28 are assumed to provide signals BIT2 and *BIT2 for ease of discussion, although in reality the output terminals of inverters 25 and 28 provide buffered signals that are both negated when CLK2 is low.

Transistor 31 has a drain for providing a signal labeled "PREN0", a gate for receiving BIT2, and a source connected to a power supply voltage terminal V$_{SS}$. In the preferred form, V$_{SS}$ is a negative power supply voltage terminal and is approximately zero volts. Transistor 41 has a drain, a gate for receiving *BIT2, and a source connected to V$_{SS}$. Transistor 42 has a drain for providing a predecoded signal labeled "PRE0", a gate for receiving BIT0, and a source connected to the drain of transistor 41. Transistor 43 has a drain for providing a predecoded signal labeled "PRE1", a gate for receiving *BIT0, and a source connected to the drain of transistor 41. Transistor 44 has a drain connected to the drain of transistor 42, a gate for receiving BIT1, and a source connected to the drain of transistor 43. Transistor 51 has a drain, a gate for receiving BIT2, and a source connected to V$_{SS}$. Transistor 52 has a drain for providing a predecoded signal labeled "PREN1", a gate for receiving *BIT0, and a source connected to the drain of transistor 51. Transistor 53 has a drain for providing a predecoded signal labeled "PREN2", a gate for receiving BIT0, and a source connected to the drain of transistor 51. Transistor 54 has a drain connected to the drain of transistor 52, a gate for receiving *BIT1, and a source connected to the drain of transistor 53. Transistor 61 has a drain, a gate for receiving *BIT2, and a source connected to V$_{SS}$. Transistor 62 has a drain for providing a predecoded signal labeled "PRE2", a gate for receiving BIT0, and a source connected to the drain of transistor 61. Transistor 63 has a drain for providing a predecoded signal labeled "PRE3", a gate for receiving *BIT0, and a source connected to the drain of transistor 61. Transistor 64 has a drain connected to the drain of transistor 62, a gate for receiving *BIT1, and a source connected to the drain of transistor 63. Transistor 71 has a drain, a gate for receiving BIT2, and a source connected to V$_{SS}$. Transistor 72 has a drain for providing a predecoded signal labeled "PREN3", a gate for receiving *BIT0, and a source connected to the drain of transistor 71. Transistor 73 has a drain for providing a predecoded signal labeled "ABS4", a gate for receiving BIT0, and a source connected to the drain of transistor 71. Transistor 74 has a drain connected to the drain of transistor 72, a gate for receiving BIT1, and a source connected to the drain of transistor 73.

In grouping portion 16, transistor 80 has a source connected to a power supply voltage terminal V$_{DD}$, a gate for receiving an enable signal *PRECHARGE, and a drain connected to the drain of transistor 31. In the illustrated form, V$_{DD}$ is a positive power supply voltage terminal and is approximately five volts. Transistor 81 has a source connected to V$_{DD}$, a gate for receiving *PRECHARGE, and a drain connected to the drain of transistor 42. Transistor 82 has a source connected to V$_{DD}$, a gate for receiving *PRECHARGE, and a drain connected to the drain of transistor 43. Transistor 83 has a source connected to V$_{DD}$, a gate for receiving *PRECHARGE, and a drain connected to the drain of transistor 52. Transistor 84 has a source connected to V$_{DD}$, a gate for receiving *PRECHARGE, and a drain connected to the drain of transistor 53. Transistor 85 has a source connected to V$_{DD}$, a gate for receiving *PRECHARGE, and a drain connected to the drain of transistor 62. Transistor 86 has a source connected to V$_{DD}$, a gate for receiving *PRECHARGE, and a drain connected to the drain of transistor 63. Transistor 87 has a source connected to V$_{DD}$, a gate for receiving *PRECHARGE, and a drain connected to the drain of transistor 72. Transistor 88 has a source connected to V$_{DD}$, a gate for receiving *PRECHARGE, and a drain connected to the drain of transistor 73.

Transistor 90 has a drain connected to the drain of transistor 31, a gate for receiving a disable signal DISABLE, and a source connected to V$_{SS}$. Transistor 91 has a drain connected to the drain of transistor 43, a gate for receiving the DISABLE signal, and a source connected to V$_{SS}$. Transistor 92 has a drain connected to the drain of transistor 53, a gate for receiving the DISABLE signal, and a source connected to V$_{SS}$. Transistor 93 has a drain connected to the drain of transistor 63, a gate for receiving the DISABLE signal, and a source connected to V$_{SS}$. Transistor 94 has a drain connected to the drain of transistor 73, a gate for receiving the DISABLE signal, and a source connected to V$_{SS}$. NAND gate 95 has a first input terminal for receiving PREN0, a second input terminal for receiving PRE0, and an output terminal for supplying an absolute value bit *ABS0. NAND gate 96 has a first input terminal for receiving PRE1, a second input terminal for receiving PREN1, and an output terminal for supplying an absolute value bit *ABS1. NAND gate 97 has a first input terminal for receiving PREN2, a second input terminal for receiving PRE2, and an output terminal for supplying an absolute value bit *ABS2. NAND gate 98 has a first input terminal for receiving PRE3, a second input terminal for receiving PREN3, and an output terminal for supplying an absolute value bit *ABS3.

In basic operation, absolute value decoder 10 determines an absolute value of a three-digit two's complement number, and provides five bits to indicate that the absolute value is either 0, 1, 2, 3 or 4, respectively. The following truth table is useful in understanding the operation of absolute value decoder 10:

| BIT2 | BIT1 | BIT0 | NUMBER | ABSOLUTE VALUE |
|---|---|---|---|---|
| 0 | 0 | 0 | 0 | 0 |
| 0 | 0 | 1 | 1 | 1 |
| 0 | 1 | 0 | 2 | 2 |
| 0 | 1 | 1 | 3 | 3 |
| 1 | 0 | 0 | −4 | 4 |
| 1 | 0 | 1 | −3 | 3 |
| 1 | 1 | 0 | −2 | 2 |
| 1 | 1 | 1 | −1 | 1 |

The DISABLE signal disables operation of absolute value decoder 10 by forcing a low voltage on one input of each NAND gate, making the output of each NAND gate a high voltage and negating ABS4. The *PRECHARGE signal precharges the inputs of NAND gates 95-98. *PRECHARGE is asserted at the beginning of a decoding cycle, when CLK is low. While *PRECHARGE is active, BIT0 and BIT1 become stable and determine whether transistors 42-44, 52-54, 62-64, and 72-74 are conductive. Both the sign bit and the complement of the sign bit (BIT2 and *BIT2) are inactive during the period in which *PRECHARGE is asserted. When CLK becomes high, *PRECHARGE is negated, and BIT2 and *BIT2 both become valid. Then the value of the input number either discharges the NAND gate inputs or fails to discharge the NAND gate inputs. Another embodiment could be accomplished by using N-channel depletion-mode transistors in place of transistors 80-88. Since N-channel depletion-mode transistors are conductive with a gate to source voltage is greater than 0, no precharging is necessary and since transistors in predecoding portion 14 are connected in an open-drain fashion.

To understand operation of absolute value decoder 10, consider an example in which negative two, (−2), is an input number to be decoded. In two's complement format, BIT2 is 1, BIT1 is 1, and BIT0 is 0. It is desired for *ABS2 to be asserted when the input number is either 2 or −2. In column 50, BIT2 makes transistor 51 conductive, providing a low voltage on the sources of transistors 52 and 53. Since BIT0 is low, *BIT0 is high, making transistor 52 conductive and negating PREN1. Transistor 53 is nonconductive, and *BIT1 is low, making transistor 54 nonconductive. Since neither transistor 54 nor transistor 53 is conductive, PREN2 is pulled high by transistor 84. It can be seen that PRE2 is also a logic high, because transistor 61 is nonconductive and transistor 85 pulls PRE2 to a logic high. Since both PREN2 and PRE2 are logically asserted, the output of NAND gate 92, *ABS2, is a logic low.

Each NAND gate of NAND gates 95-98 receives a predecoded signal for a positive number and for a negative number, each having an absolute value of a number corresponding to that of the NAND gate. Signal ABS4 however is determined only by predecoding negative four (−4), because a maximum value of a positive three-digit two's complement number is three. Another exception occurs in the generation of signal *ABS0. Since no negative number in two's complement format has the value zero as its absolute value, transistor 31 is included to ensure that if the sign bit is one, signal *ABS0 is never asserted. Methods of handling zero and the maximum value of a negative number may differ from application to application.

Similar to the example of minus two (−2), each possible value of the input number has a predecoded signal associated with it. Each of columns 30, 40, 50, 60 and 70 provides one or two predecoded signals for either a negative number or a positive number, depending on whether transistors 31, 41, 51, 61 or 71, respectively, are controlled by sign bit BIT2 or its complement *BIT2. For example, column 50 is associated with negative numbers because transistor 51 is controlled by BIT2. Each column providing two predecoded signals provides one predecoded signal as an even number, and another predecoded signal as an odd number, and a difference in value between the first predecoded signal and the second predecoded signal is one. In column 50, transistors 52 and 53 differentiate between even and odd numbers. Transistor 52 is controlled by *BIT0, and is active when an even number is indicated by BIT0 being low. When transistor 52 becomes conductive by BIT0 being low, if sign bit BIT2 indicates a negative number, then PREN1 is low and *ABS1 is high.

Columns 30 and 70 are special because each provides only one predecoded signal. Column 30 provides signal PREN0 to indicate that the input number is negative, and since no negative number in two's complement format has 0 as its absolute value, PREN0 keeps *ABS0 from being asserted when BIT2 indicates a negative number. Also, column 70 is special because no positive three-digit number in two's complement format has the number "four" as its absolute value. Signal ABS4 could have provided a first input for a NAND gate similar to NAND gate 95, with a second input for the NAND gate being provided by a signal analogously to PREN0 and indicating that the input number is positive, but such uses are implementation-specific and each possible implementation need not be considered.

Figure 2:
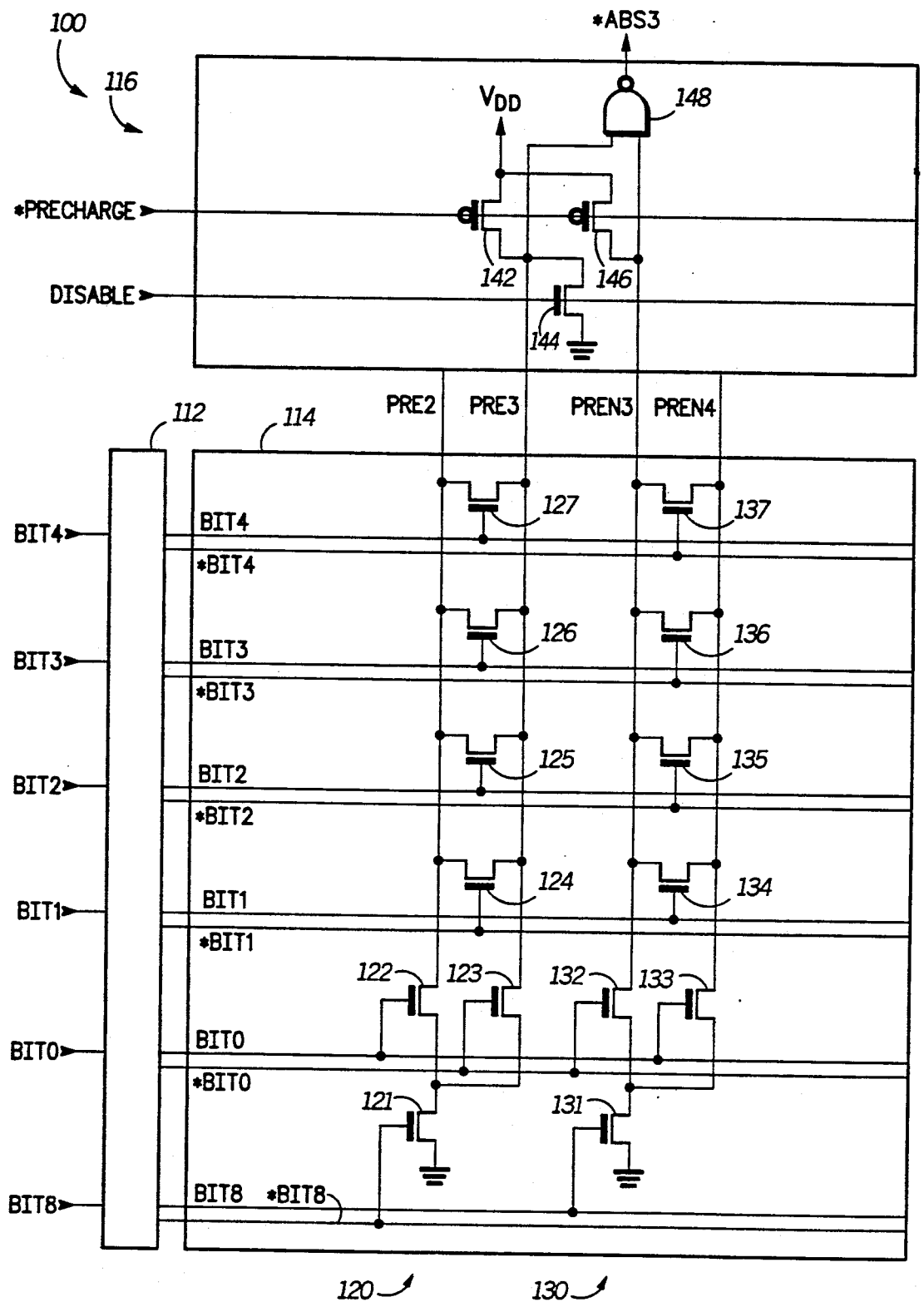
FIG. 2 illustrates in partial schematic and block diagram form a preferred embodiment of an absolute value decoder in accordance with the present invention.

From a trivial example of a three-digit two's complement number shown in FIG. 1, it should be apparent that absolute value decoders of arbitrary sizes may be constructed by modifying absolute value decoder 10. FIG. 2 shows an absolute value decoder 100 in accordance with a preferred embodiment of the present invention. Absolute value decoder 100 receives eight lower-order bits and a sign bit of a nine-bit input number, and provides thirty-five absolute value signals as outputs.

Absolute value decoder 100 comprises generally a bit inversion portion 112, a predecoding portion 114, and a grouping portion 116. Bit inversion portion 112 receives five lower order bits and a sign bit of a nine-bit input number, BIT0, BIT1, BIT2, BIT3, BIT4, and BIT8, and provides BIT0, *BIT0, BIT1, *BIT1, BIT2, *BIT2, BIT3, *BIT3, BIT4, *BIT4, BIT8, and *BIT8 in response. As for corresponding signals in absolute value decoder 10 of FIG. 1, input bits BIT0-BIT4 and BIT8 are actually buffered in the same way as corresponding input number signals in FIG. 1, but are given the same name for ease of discussion.

In predecoding portion 114, two adjacent columns 120 and 130 which are representative of all other columns except special columns are shown. Column 120 comprises an N-channel transistor 121, N-channel transistor 122, N-channel transistor 123, N-channel transistor 124, N-channel transistor 125, N-channel transistor 126, and N-channel transistor 127. Column 130 comprises N-channel transistor 131, N-channel transistor 132, N-channel transistor 133, N-channel transistor 134, N-channel transistor 135, N-channel transistor 136, and N-channel transistor 137. In grouping portion 116, representative circuitry to provide an absolute value signal *ABS3 is shown, including a P-channel transistor 142, an N-channel transistor 144, a P-channel transistor 146, and a NAND gate 148.

In predecoding portion 114, transistor 121 has a drain, a gate for receiving *BIT8, and a source connected to a reference ground voltage commonly designated as $V_{SS}$. Transistor 122 has a drain for providing PRE2, a gate for receiving BIT0, and a source connected to the drain of transistor 121. Transistor 123 has a drain for providing signal PRE3, a gate for receiving *BIT0, and a source connected to the drain of transistor 121. Transistor 124 has a drain connected to the drain of transistor 122, a gate for receiving *BIT1, and a source connected to the drain of transistor 123. Transistor 125 has a drain connected to the drain of transistor 122, a gate for receiving BIT2, and a source connected to the drain of transistor 123. Transistor 126 has a drain connected to the drain of transistor 122, a gate for receiving BIT3, and a source connected to the drain of transistor 123. Transistor 127 has a drain connected to the drain of transistor 122, a gate for receiving BIT4, and a source connected to the drain of transistor 123.

Transistor 131 has a drain, a gate for receiving BIT8, and a source connected to the reference ground voltage $V_{SS}$. Transistor 132 has a drain for providing PREN3, a gate for receiving *BIT0, and a source connected to the drain of transistor 131. Transistor 133 has a drain for providing signal PREN4, a gate for receiving BIT0, and a source connected to the drain of transistor 131. Transistor 134 has a drain connected to the drain of transistor 132, a gate for receiving BIT1, and a source connected to the drain of transistor 133. Transistor 135 has a drain connected to the drain of transistor 132, a gate for receiving *BIT2, and a source connected to the drain of transistor 133. Transistor 136 has a drain connected to the drain of transistor 132, a gate for receiving *BIT3, and a source connected to the drain of transistor 133. Transistor 137 has a drain connected to the drain of transistor 132, a gate for receiving *BIT4, and a source connected to the drain of transistor 133.

In grouping portion 116, transistor 142 has a source connected to power supply voltage terminal for receiving a positive supply voltage $V_{DD}$, a gate for receiving *PRECHARGE, and a drain connected to the drain of transistor 123. Transistor 144 has a drain connected to the drain of transistor 123, a gate for receiving a disable signal DISABLE, and a source connected to $V_{SS}$. Transistor 146 has a source connected to $V_{DD}$, a gate for receiving *PRECHARGE, and a drain connected to the drain of transistor 132. NAND gate 148 has a first input terminal connected to the drain of transistor 123, a second input terminal connected to the drain of transistor 132, and an output terminal for providing signal *ABS3.

Predecoded signals PRE3 and PREN3, as well as signals PRE2 and PREN4 and other signals not shown, are generated similarly to corresponding signals in FIG. 1. For example, negative three, ($-3$), is encoded as 111111101 for BIT8-BIT0, respectively. BIT8 makes transistor 131 conductive, and BIT0 makes transistor 133 conductive, so PREN4 is coupled to $V_{SS}$. But *BIT0, BIT1, *BIT2, *BIT3, and *BIT4 are all low and transistors 132, 134, 135, 136, and 137 are all nonconductive. The *PRECHARGE signal has made transistor 146 conductive and therefore PREN3 is high. Transistor 121 is nonconductive, so PRE3 is also pulled to a logic high voltage. Since both input terminals of NAND gate 148 are at a high voltage, *ABS3 is asserted.

Absolute value decoder 100 is used to control a denormalization shift and thirty-five absolute value bits are provided. BIT5, BIT6, and BIT7, not shown in FIG. 2, are used for special purposes specific to the embodiment. BIT5 is used for doubly decoding binary values so that absolute values of 32-63 are represented as absolute values of 0-31, respectively. BIT6 is used to decode values of 64-66 which are necessary for the preferred embodiment. BIT7 signifies an overflow in the preferred embodiment, and is used with CLK to generate DISABLE. Different embodiments of the present invention may contain additional or fewer absolute value signals. As in absolute value decoder 10 of FIG. 1, columns of transistors in absolute value decoder 100 are associated with either a negative or a positive number. A first predecoded signal in a column is asserted in response to an even number, and a second predecoded signal in a column is asserted in response to an odd number, the even and odd numbers being separated in value by one. Also, a special column provides one input of a NAND gate to decode a signal to represent a negative number since zero cannot be represented by a negative number in two's complement format. Another special column provides a predecoded signal for negative thirty-one ($-31$) since minus thirty-two ($-32$), which would normally be a second predecoded signal in the column, is not needed.

Figure 3:
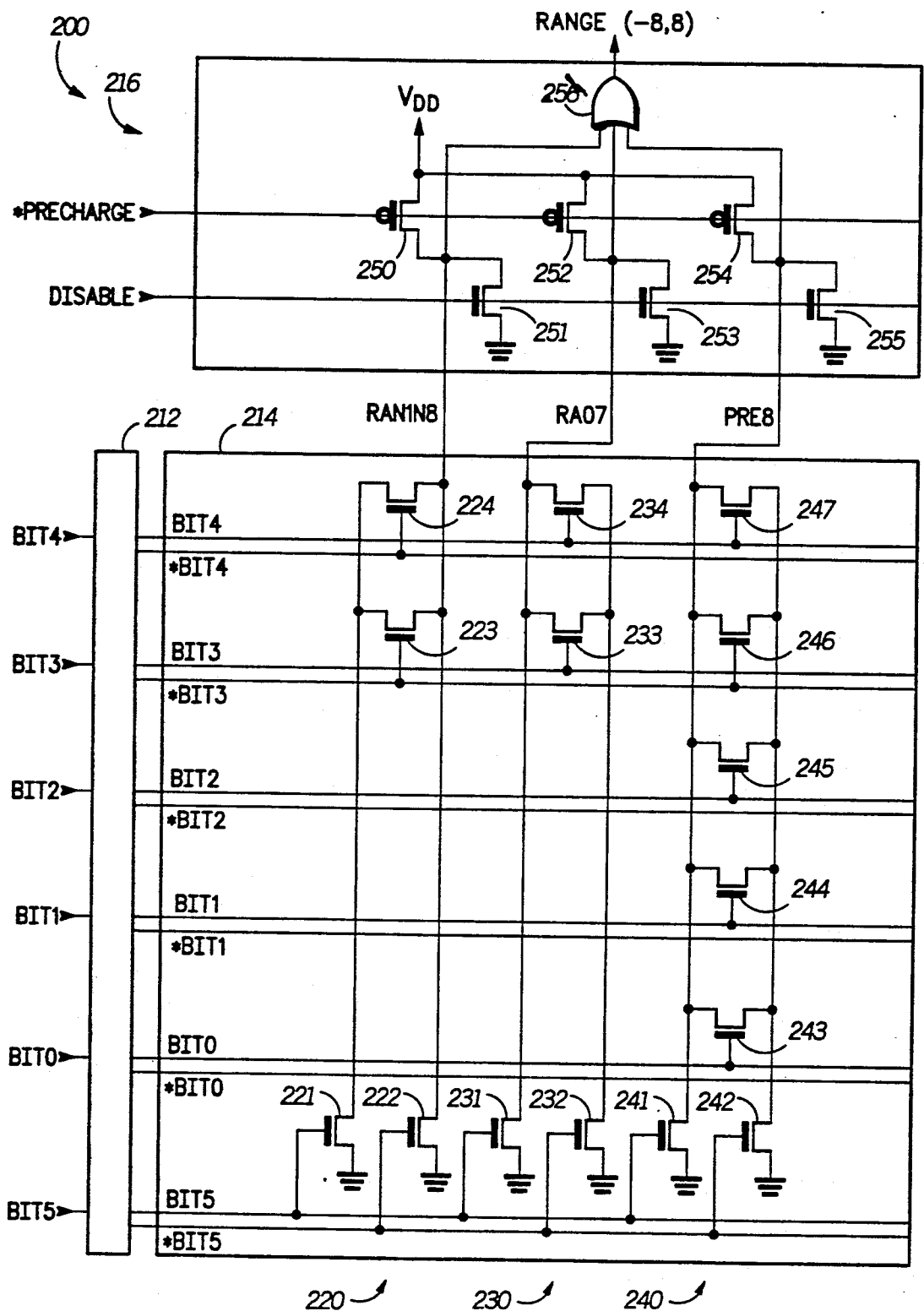
FIG. 3 illustrates in partial schematic and block diagram form an alternative embodiment which functions as a range detector instead of the absolute value decoder of FIG. 1.

In another embodiment of the present invention, a circuit substantially the same as absolute value decoder 100 of FIG. 2 can be used as a range detector. FIG. 3 shows a partial block diagram and partial schematic diagram of a range detector 200. Range detector 200 comprises a bit inversion portion 212, a predecoding portion 214 and a grouping portion 216. It is important to note that range detector 200 comprises the same general elements as absolute value decoder 100 of FIG. 2. Locations of transistors in columns in predecoding portion 214, and for logic in grouping portion 216, differ from corresponding locations in absolute value decoder 100 of FIG. 2.

Predecoding portion 214 has columns of transistors comprising column 220, a column 230 and a column 240. Column 220 comprises N-channel transistors 221-224. Column 230 comprises N-channel transistors 231-234. Column 240 comprises N-channel transistors 241-247. Grouping portion 216 comprises a P-channel transistor 250, an N-channel transistor 251, a P-channel transistor 252, an N-channel transistor 253, a P-channel transistor 254, an N-channel transistor 255, and an OR gate 256.

Transistor 221 has a drain, a gate connected to signal BIT5, and a source connected to the $V_{SS}$ ground reference supply. Transistor 222 has a drain for providing signal RAN1N8, a gate for receiving *BIT5, and a source connected to reference supply voltage $V_{SS}$. Transistor 223 has a drain connected to the drain of transistor 221, a gate for receiving *BIT3, and a source connected to the drain of transistor 222. Transistor 224 has a drain connected to the drain of transistor 221, a gate for receiving *BIT4, and a source connected to the drain of transistor 222. Transistor 231 has a drain for providing RA07, a gate connected to BIT5, and a source connected to $V_{SS}$. Transistor 232 has a drain, a gate for receiving *BIT5, and a source connected to $V_{SS}$. Transistor 233 has a drain connected to the drain of transistor 231, a gate for receiving *BIT3, and a source connected to the drain of transistor 232. Transistor 234 has a drain connected to the drain of transistor 231, a gate for receiving *BIT4, and a source connected to the drain of transistor 232.

Transistor 241 has a drain for providing signal PRE8, a gate for receiving BIT5, and a source connected to $V_{SS}$. Transistor 242 has a drain, a gate for receiving *BIT5, and a source connected to $V_{SS}$. Transistor 243 has a drain connected to the drain of transistor 241, a gate for receiving BIT0, and a source connected to the drain of transistor 242. Transistor 244 has a drain connected to the drain of transistor 241, a gate for receiving BIT1, and a source connected to the drain of transistor 242. Transistor 245 has a drain connected to the drain of transistor 241, a gate for receiving BIT2, and a source connected to the drain of transistor 242. Transistor 246 has a drain connected to the drain of transistor 241, a gate for receiving *BIT3, and a source connected to the drain of transistor 242. Transistor 247 has a drain connected to the drain of transistor 241, a gate for receiving BIT4, and a source connected to the drain of transistor 242.

Transistor 250 has a source connected to $V_{DD}$, a gate for receiving signal *PRECHARGE, and a drain connected to the drain of transistor 222. Transistor 251 has a drain connected to the drain of transistor 222, a gate for receiving a DISABLE signal, and a source connected to $V_{SS}$. Transistor 252 has a source connected to $V_{DD}$, a gate for receiving *PRECHARGE, and a drain connected to the drain of transistor 231. Transistor 253 has a drain connected to the drain of transistor 231, a gate for receiving the DISABLE signal, and a source connected to $V_{SS}$. Transistor 254 has a source connected to $V_{DD}$, a gate for receiving the *PRECHARGE signal, and a drain connected to the drain of transistor 241. Transistor 255 has a drain connected to the drain of transistor 241, a gate for receiving the DISABLE signal, and a source connected to $V_{SS}$. OR gate 256 has a first input terminal for receiving RAN1N8, a second input terminal for receiving RA07, and a third input terminal for receiving PRE8, and an output terminal for providing RANGE(−8,8).

Bit inversion portion 212 receives signals BIT0, BIT1, BIT2, BIT3, BIT4, and BIT5, and provides signals BIT0, *BIT0, BIT1, *BIT1, BIT2, *BIT2, BIT3, *BIT3, BIT4, *BIT4, BIT5, and *BIT5. BIT5 is a sign bit for the input number in range decoder 200. As before, true signals BIT0-BIT4 are actually buffered in the same way as corresponding input number signals in FIG. 1, but are given the same name for ease of discussion.

Each column in predecoding portion 214 provides one signal to indicate a range of values which the input number falls within, and in a sense each column is special. Column 220 provides signal RAN1N8 to indicate a negative number in a range between negative one and negative eight, inclusive. To decode a range of values, column 220 does not contain transistors for all bits of the input number. Similarly, column 230 decodes RA07, or all positive numbers in a range between zero and seven, inclusive. Finally, signal PRE8 decodes positive eight exactly. Note that an absolute value decoder like absolute value decoder 10 of FIG. 1 or absolute value decoder 100 of FIG. 2 is a special case of range detector 200, in which each column which is not special provides two predecoded signals with a range of one.

Grouping portion 216 provides voltage pullups through the use of transistors 250, 252, and 254, a disable function through the use of transistors 251, 253, and 255, and combines RAN1N8, RA07, and PRE8 through three-input OR gate 256 to provide signal RANGE(−8,8), a signal indicating the input number falls within the range negative eight to eight. It should be apparent that any arbitrary range of numbers can be indicated by range decoder 200 depending on placement of transistors and connection of gates of the transistors in each column used. While the grouping portion of an absolute value decoder provides an indication of the input number being either a positive number or a negative number with a given absolute value, grouping portion 216 of range detector 200 provides an indication of the input number having any attributes defined by placement and connection of transistors in predecoding portion 214.

By now it should be apparent that an absolute value decoder which provides signals to indicate an absolute value of a number, preferably in two's complement form, has been described. Another embodiment of the invention, a range detector, has also been described, and it should be apparent that the absolute value decoder is a special case of the range detector in which the range of each column is equal to one.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. An absolute value decoder for providing an absolute value bit representing when an input number has a predetermined absolute value, the input number having a plurality of bits including a sign bit, comprising:

bit inversion means, for receiving the input number and for providing a logical complement of each bit of the input number;

precharge means, for precharging each of a plurality of predecoded signals to a first logic state during a precharge period;

predecoding means coupled to said bit inversion means and to said precharge means, for discharging each predecoded signal having a sign bit equal to the sign bit of the input number, to a second logic state in response to a plurality of remaining bit positions of the input number not being equal to corresponding bit positions of said predecoded signal, said predecoding means comprising a plurality of columns of transistors, each of said plurality of columns of transistors providing at least one predecoded signal in response to either a bit or a complement of said bit for each remaining bit position of the input number, each of said plurality of columns of transistors providing either, a first predecoded signal corresponding to a positive, even number and a second predecoded signal corresponding to a positive, odd number, or a first predecoded signal corresponding to a negative, even number and a second predecoded signal corresponding to a negative, odd number, said even number and said odd number being separated in magnitude by one; and grouping means coupled to said predecoding means, for providing the absolute value bit in response to both a predecoded signal corresponding to a positive number with the predetermined absolute value, and a predecoded signal corresponding to a negative number having the predetermined absolute value, being in said first logic state.

2. The absolute value decoder of claim 1, wherein each of said plurality of columns comprises:

a first transistor having a first current electrode coupled to a negative power supply voltage terminal, a control electrode for receiving either, the sign bit if said first and second predecoded signals are negative, or a complement of the sign bit if said first and second predecoded signals are positive, and a second current electrode;

a second transistor, having a first current electrode coupled to said grouping means and providing said first predecoded signal thereto, a control electrode for receiving a least significant bit, and a second current electrode coupled to said second current electrode of said first transistor; and a third transistor, having a first current electrode coupled to said grouping means and providing said second predecoded signal thereto, a control electrode for receiving a complement of said least significant bit, and a second current electrode coupled to said second current electrode of said first transistor; and shorting means coupled to said bit inversion means, to said first current electrode of said second transistor, and to said first current electrode of said third transistor, for coupling said first current electrode of said second transistor to said first current electrode of said third transistor in response to a plurality of remaining bits of the input number.

3. The absolute value decoder of claim 2, wherein said shorting means comprises a plurality of transistors, each transistor of said plurality of transistors corresponding to a remaining bit position in said input number and each transistor of said plurality of transistors coupling said first current electrode of said first transistor to said first current electrode of said second transistor if the input number does not equal said predetermined value in said plurality of remaining bits.

4. The absolute value decoder of claim 1, wherein said grouping means comprises a plurality of logic gates, each of said plurality of logic gates having a first input terminal for receiving a third predecoded signal, a second input terminal for receiving a fourth predecoded signal, and an output terminal for providing an absolute value bit, wherein said third predecoded signal represents a positive number with a given absolute value, and wherein said fourth predecoded signal represents a negative number with said given absolute value.

5. The absolute value decoder of claim 4, wherein each of said plurality of logic gates receives said third predecoded signal from a first column, and said fourth predecoded signal from a second column.

6. An absolute value decoder for providing an absolute value bit in response to an input number having a predetermined absolute value, the input number having a plurality of bits ordered from a least significant bit to a most significant bit, the most significant bit being a sign bit of the input number, comprising:

bit invertion means, for providing the input number and a logical complement of each bit of the input number;

a first column of transistors for providing first and second predecoded signals representing when the input number respectively has first and second predetermined values, said first and second predetermined values differing only in the least significant bit position and both said first predetermined value and said second predetermined value being positive;

a second column of transistors for providing third and fourth predecoded signals representing when the input number respectively has third and fourth predetermined values, said third and fourth predetermined values differing only in the least significant bit position and both said third predetermined value and said fourth predetermined value being negative;

precharge means, for coupling said first, second, third, and fourth predecoded signals to a second power supply voltage terminal during a precharge period thereof; and grouping means coupled to said first and second columns of transistors, for providing the absolute value bit in response to an assertion of either said second predecoded signal or said third predecoded signal.

7. The absolute value decoder of claim 6 wherein said bit inversion means provides the sign bit and a complement of the sign bit after said precharge period.

8. The absolute value decoder of claim 6 wherein said first column comprises:

a first transistor having a first current electrode coupled to a power supply voltage terminal, a control electrode for receiving the sign bit of the input number, and a second current electrode;

a second transistor having a first current electrode coupled to said second current electrode of said first transistor, a control electrode for receiving the least significant bit of the input number, and a second current electrode for providing said first predecoded signal;

a third transistor having a first current electrode coupled to said second current electrode of said first transistor, a control electrode for receiving a complement of the least significant bit of the input number, and a second current electrode for providing said second predecoded signal; and a plurality of transistors corresponding to a plurality of remaining bit positions in the input number, wherein each transistor has first and second current electrodes respectively coupled to said first and second predecoded signals, and a control electrode coupled to a corresponding bit position.

9. The absolute value decoder of claim 8 wherein said precharge means comprises fourth, fifth, sixth, and seventh transistors each having a first current electrode coupled to a positive power supply voltage terminal, a control electrode for receiving a precharge signal, and second current electrodes respectively coupled to said first, second, third, and fourth predecoded signals.

10. The absolute value decoder of claim 9 wherein said first, second, and third transistors are N-channel transistors, and wherein said fourth, fifth, sixth, and seventh transistors are P-channel transistors.

11. An absolute value decoder for providing an absolute value bit in response to an input number having a predetermined absolute value, the input number having a plurality of bits ordered from a first bit to a last bit, the first bit being a least significant bit of the input number, and the last bit being a sign bit of the input number, comprising:

bit inversion means, for receiving the input number and for providing each bit and a logical complement of each bit of the input number;

a first transistor having a first current electrode coupled to a first power supply voltage terminal, a control electrode for receiving a complement of the sign bit of the input number, and a second current electrode;

a second transistor having a first current electrode coupled to said second current electrode of said first transistor, a control electrode for receiving the first bit of the input number, and a second current electrode for providing a first predecoded signal;

a third transistor having a first current electrode coupled to said second current electrode of said first transistor, a control electrode for receiving a complement of the first bit of the input number, and a second current electrode for providing a second predecoded signal;

a fourth transistor having a first current electrode coupled to the first predecoded signal, a control electrode coupled to a complement of a second bit of the input number, and a second current electrode coupled to said second predecoded signal;

a fifth transistor having a first current electrode coupled to said first predecoded signal, a control electrode coupled to a third bit of the input number, and a second current electrode coupled to said second predecoded signal;

a sixth transistor having a first current electrode coupled to said first predecoded signal, a control electrode coupled to a fourth bit of the input number, and a second current electrode coupled to said second predecoded signal;

a seventh transistor having a first current electrode coupled to said first predecoded signal, a control electrode coupled to a fifth bit of the input number, and a second current electrode coupled to said second predecoded signal;

an eighth transistor having a first current electrode coupled to said power supply voltage terminal, a control electrode for receiving the sign bit of the input number, and a second current electrode;

a ninth transistor having a first current electrode coupled to said second current electrode of said eighth transistor, a control electrode for receiving a complement of the first bit of the input number, and a second current electrode for providing a third predecoded signal;

a tenth transistor having a first current electrode coupled to said second current electrode of said eighth transistor, a control electrode for receiving the first bit of the input number, and a second current electrode for providing a fourth predecoded signal;

a eleventh transistor having a first current electrode coupled to the third predecoded signal, a control electrode coupled to said second bit of the input number, and a second current electrode coupled to said fourth predecoded signal;

a twelfth transistor having a first current electrode coupled to said third predecoded signal, a control electrode coupled to a complement of said third bit of the input number, and a second current electrode coupled to said fourth predecoded signal;

a thirteenth transistor having a first current electrode coupled to said third predecoded signal, a control electrode coupled to a complement of said fourth bit of the input number, and a second current electrode coupled to said fourth predecoded signal;

a fourteenth transistor having a first current electrode coupled to said third predecoded signal, a control electrode coupled to a complement of said fifth bit of the input number, and a second current electrode coupled to said fourth predecoded signal;

precharge means, for coupling said first, second, third, and fourth predecoded signals to a second power supply voltage terminal during a precharge period; and grouping means, for providing the absolute value signal in response to either said second predecoded signal or said third predecoded signal being at a voltage substantially equal to said second power supply voltage.

* * * * *